(12) United States Patent
Ronchetto et al.

(10) Patent No.: US 11,912,131 B2
(45) Date of Patent: Feb. 27, 2024

(54) TRANSMISSION MODULE FOR A HYBRID DRIVE VEHICLE

(71) Applicant: DAYCO EUROPE S.R.L., Chieti (IT)

(72) Inventors: Roberto Ronchetto, Chieti (IT); Alessio Courtial, Turin (IT); Gregorio Luciani, Chieti (IT)

(73) Assignee: DAYCO EUROPE S.R.L., Chieti (IT)

( * ) Notice: Subject to any disclaimer, the term of this patent is extended or adjusted under 35 U.S.C. 154(b) by 254 days.

(21) Appl. No.: 17/596,793

(22) PCT Filed: Jun. 19, 2020

(86) PCT No.: PCT/IB2020/055790
§ 371 (c)(1),
(2) Date: Dec. 17, 2021

(87) PCT Pub. No.: WO2020/255067
PCT Pub. Date: Dec. 24, 2020

(65) Prior Publication Data
US 2022/0297527 A1 Sep. 22, 2022

(30) Foreign Application Priority Data

Jun. 20, 2019 (IT) ......................... 102019000009612

(51) Int. Cl.
*B60K 25/02* (2006.01)
*F16H 7/02* (2006.01)
(Continued)

(52) U.S. Cl.
CPC .................. *B60K 6/40* (2013.01); *B60K 6/36* (2013.01); *B60K 6/48* (2013.01); *B60K 25/02* (2013.01);
(Continued)

(58) Field of Classification Search
CPC ... B60K 6/40; B60K 6/36; B60K 6/48; B60K 25/02; B60K 2006/4825; B60K 2025/022;
(Continued)

(56) References Cited

U.S. PATENT DOCUMENTS

2009/0139820 A1* 6/2009 Krause .............. F16F 15/12366
192/3.29
2011/0098151 A1* 4/2011 Ziemer .................. B60K 6/485
180/65.265
(Continued)

FOREIGN PATENT DOCUMENTS

DE  102015225421 A1 *  6/2017  .......... B60K 17/342
JP  2005344787 A  * 12/2005
(Continued)

OTHER PUBLICATIONS

PCT/IB2020/05579, International Search Report and Written Opinion, dated Oct. 7, 2020 (13 pages).

*Primary Examiner* — Jacob S. Scott
*Assistant Examiner* — Farhana Pervin
(74) *Attorney, Agent, or Firm* — FisherBroyles, LLP; Susan M. Oiler

(57) ABSTRACT

A transmission module for a hybrid drive vehicle adapted to be interposed between an internal combustion engine and a vehicle transmission has a tray-like support structure defining a housing for a decoupling clutch and adapted to be fixed to the internal combustion engine. A module drive is carried by the support structure and has a first transmission member adapted to be connected to the decoupling clutch by means of a torsional vibration damper and has a second transmission member adapted to be connected to an electric machine. The torsional vibration damper has an actuator defining a centering with respect to the crankshaft and to a transmis-
(Continued)

sion torque converter and has a seat for a support bearing with respect to the support structure.

8 Claims, 9 Drawing Sheets

(51) Int. Cl.
*B60K 6/40* (2007.10)
*B60K 6/36* (2007.10)
*B60K 6/48* (2007.10)
*F16H 57/035* (2012.01)
*F16H 55/36* (2006.01)
*F16H 57/02* (2012.01)

(52) U.S. Cl.
CPC ............ *F16H 7/02* (2013.01); *F16H 57/035* (2013.01); *B60K 2006/4825* (2013.01); *B60K 2025/022* (2013.01); *B60Y 2200/92* (2013.01); *F16H 2055/366* (2013.01); *F16H 2057/02034* (2013.01); *F16H 2057/02043* (2013.01)

(58) Field of Classification Search
CPC ............ B60K 6/405; B60K 2006/4833; B60K 6/547; F16H 7/02; F16H 7/00; F16H 7/0829; F16H 57/035; F16H 2057/02034; F16H 2057/02043; B60Y 2200/92; Y02T 10/62
See application file for complete search history.

(56) References Cited

U.S. PATENT DOCUMENTS

| | | | |
|---|---|---|---|
| 2013/0193816 A1* | 8/2013 | Iwase | B60L 50/16 310/75 R |
| 2017/0190245 A1* | 7/2017 | Mackowiak | H02K 5/225 |
| 2018/0051792 A1* | 2/2018 | Cariccia | F16F 15/123 |

FOREIGN PATENT DOCUMENTS

| | | | | |
|---|---|---|---|---|
| WO | WO-2016184459 A1 * | 11/2016 | ............ | B60K 6/387 |
| WO | WO-2017067554 A1 * | 4/2017 | ............ | F16D 13/52 |

* cited by examiner

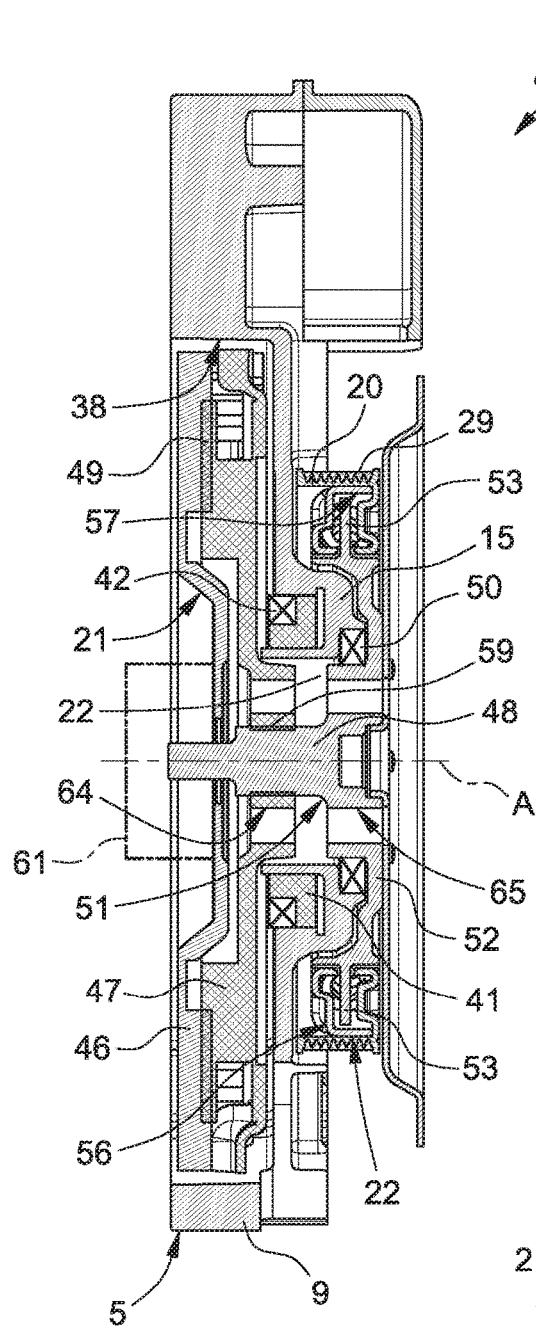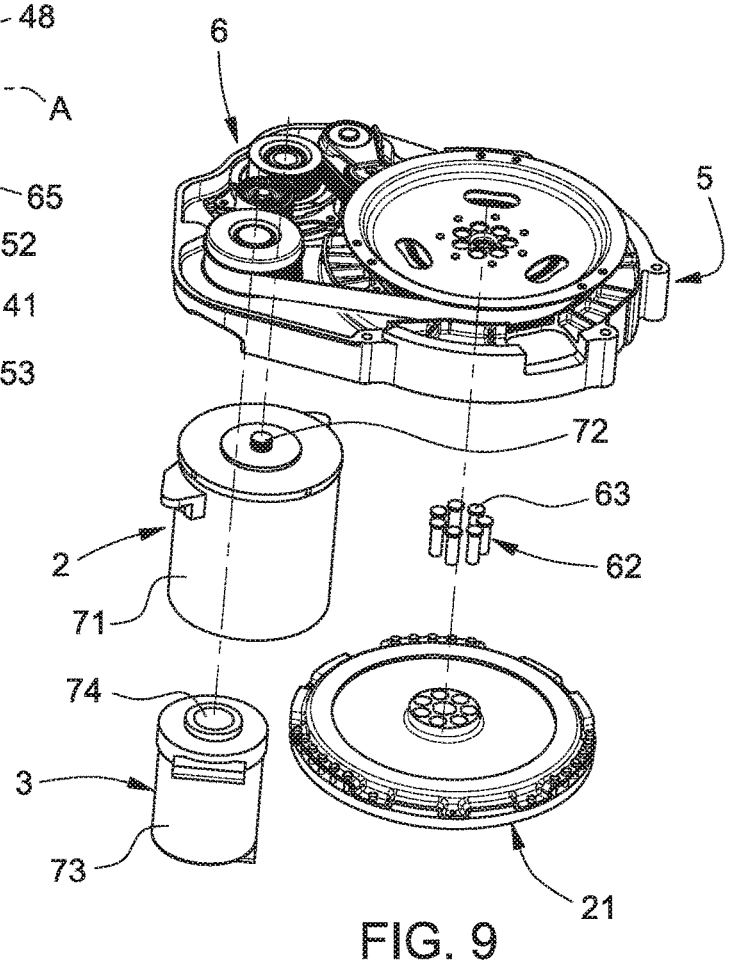
FIG. 8
FIG. 9

TRANSMISSION MODULE FOR A HYBRID DRIVE VEHICLE

CROSS-REFERENCE TO RELATED APPLICATIONS

The present invention is filed under 35 U.S.C. § 371 as the U.S. National Phase of International Patent Application No. PCT/IB2020/055790, filed Jun. 19, 2020, which designated the United States and which claims the benefit of Italian patent application no. 102019000009612, filed on Jun. 20, 2019, the entire disclosure of which is incorporated herein by reference.

TECHNICAL FIELD

The present invention concerns a transmission module for a hybrid drive vehicle, and in particular a transmission module adapted to be interposed between an internal combustion engine and a transmission of a hybrid drive vehicle.

BACKGROUND ART

As is known, hybrid drive vehicles comprise an internal combustion engine and at least an electric machine which can be used as generator or motor for delivering torque in combination with (or alternatively to) the internal combustion engine, according to the vehicle operating conditions.

A configuration in which an electric machine is used connected between the internal combustion engine and the vehicle transmission is conventionally called "P2". Modular units are known adapted to be interposed between the internal combustion engine and the transmission of a vehicle (and therefore currently called "P2 modules") which comprise, in addition to the electric machine, one or more clutches to selectively connect to the transmission the internal combustion engine and/or the electric machine, in addition to the relative actuators and transmission elements.

A problem connected with the known P2 modules is the complexity of installation and assembly, due to the fact that said modules comprise relatively heavy parts which have to be accurately centred and supported both with respect to the internal combustion engine and with respect to the module being installed.

DISCLOSURE OF INVENTION

The object of the present invention is the production of a P2 transmission module, which solves the above-mentioned problem.

The above-mentioned object is achieved by a transmission module for a hybrid drive unit of a vehicle that has an internal combustion engine having a crankshaft, a decoupling clutch arranged coaxially with the crankshaft and a vehicle transmission. The transmission module is configured to be interposed between the engine and the transmission and has a support structure securable to the engine and a module drive housed in the support structure. The module drive has a first transmission member having an axis coinciding, in use, with the axis of the crankshaft and of the decoupling clutch, a torsional vibration damper configured to connect an output member of the decoupling clutch with the first transmission member, at least a second transmission member configured to be connected to an electric machine, and a transmission element connecting at least the said first and second transmission members. The torsional vibration damper has an actuator provided with a hub, a disc coaxial with the hub and adapted to be coupled to the first transmission member by elastic means and a shaft extending from one side of the hub, in use facing the engine. The shaft has an end portion configured to define a centering with respect to the crankshaft and a splined portion for coupling with a disc of the decoupling clutch rotationally fixed and axially sliding. The hub defines a seat for a bearing supporting the support structure and, on a side facing in use the vehicle transmission, a centering for a transmission member.

BRIEF DESCRIPTION OF THE DRAWINGS

For a better understanding of the present invention, a preferred embodiment is described below with reference to the attached drawings, in which:

FIGS. 7 and 8 are sections along the lines VII-VII and VIII-VIII respectively of FIG. 6;

FIG. 9 is an exploded perspective view of the hybrid unit;

BEST MODE FOR CARRYING OUT THE INVENTION

Figure 1:
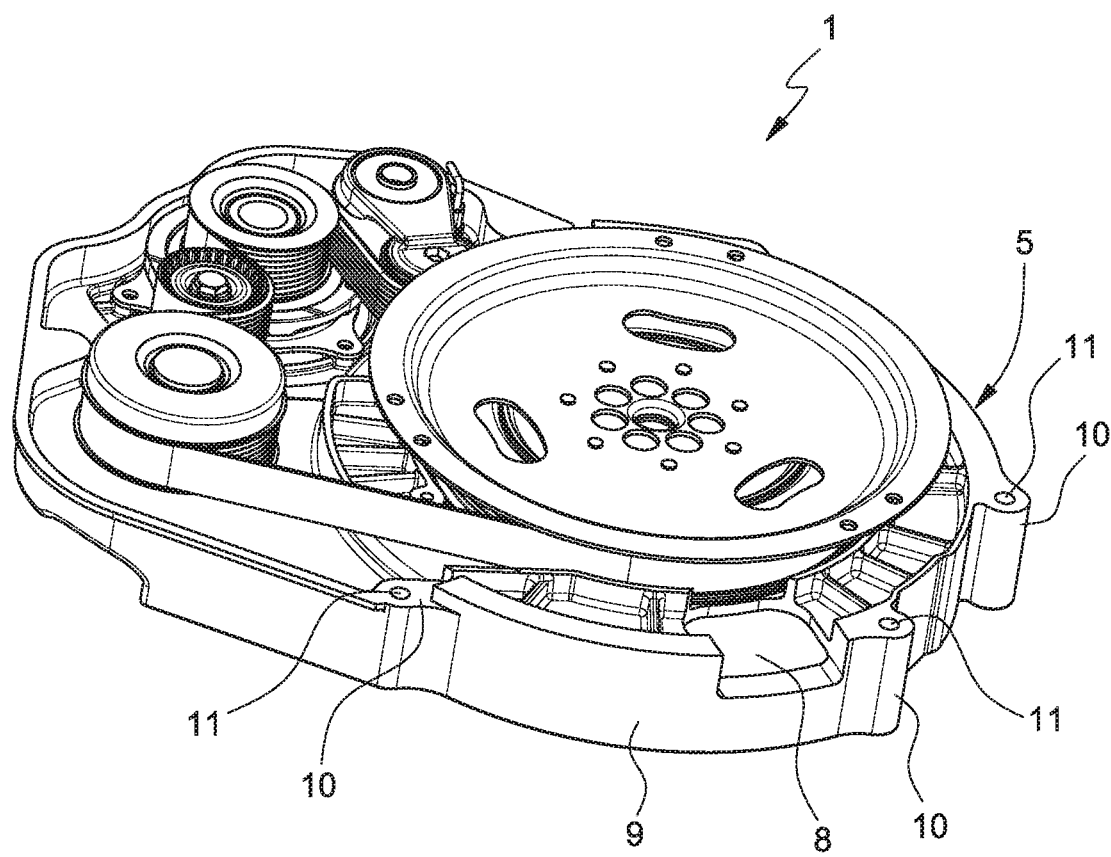
FIG. 1 is a perspective view of a transmission module according to the present invention.
Figure 2:
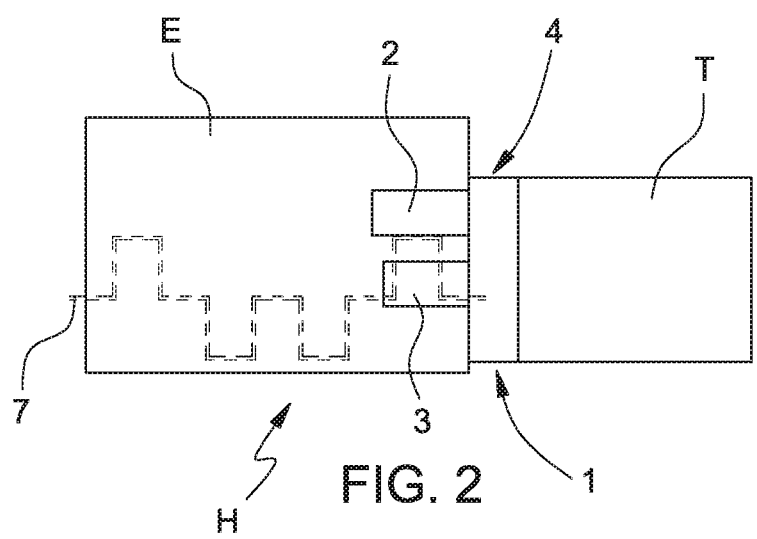
FIG. 2 is a diagram of a hybrid drive unit of a vehicle comprising the module of the invention.
Figure 3:
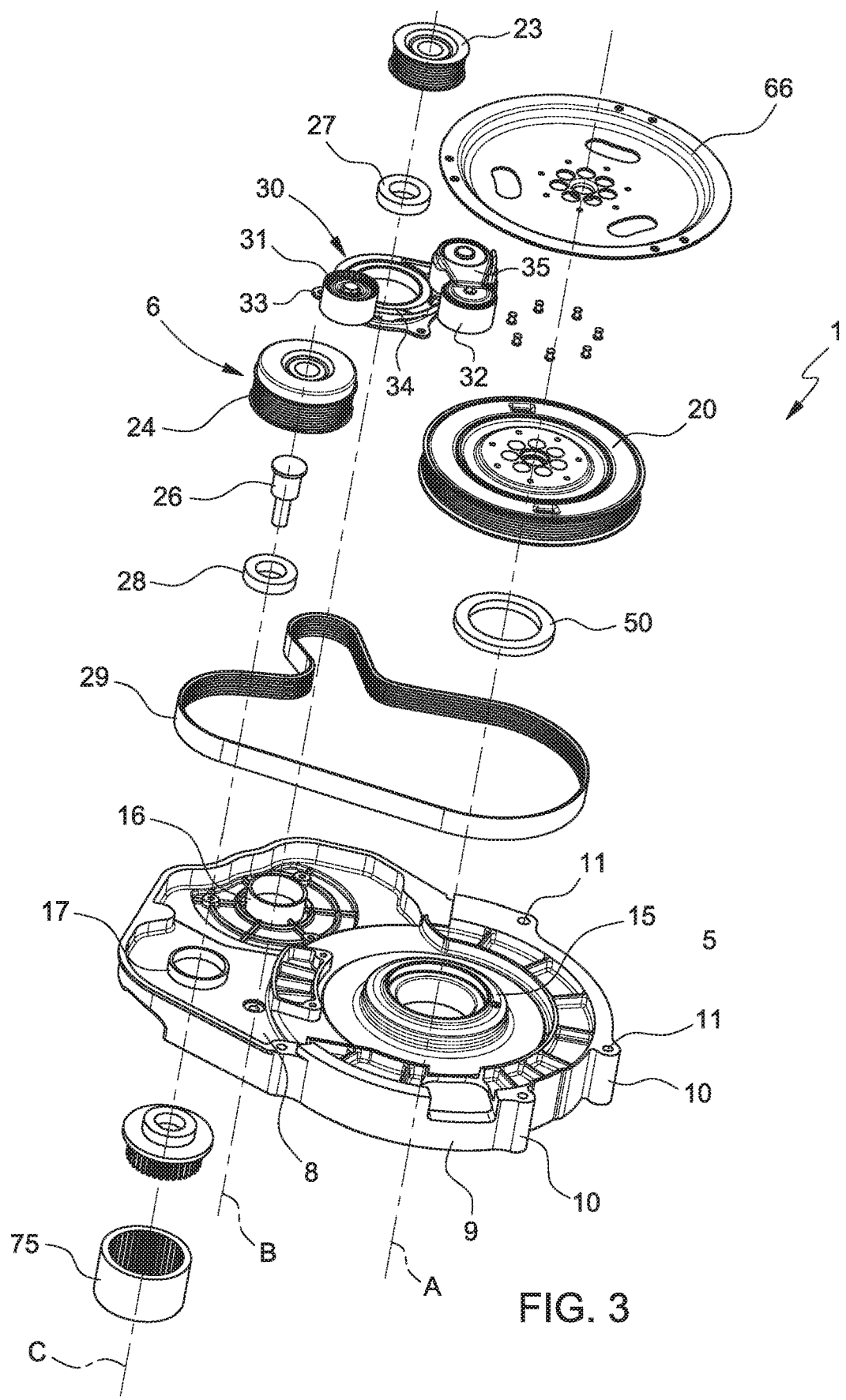
FIG. 3 is an exploded perspective view of the module of FIG. 1.
Figure 15:
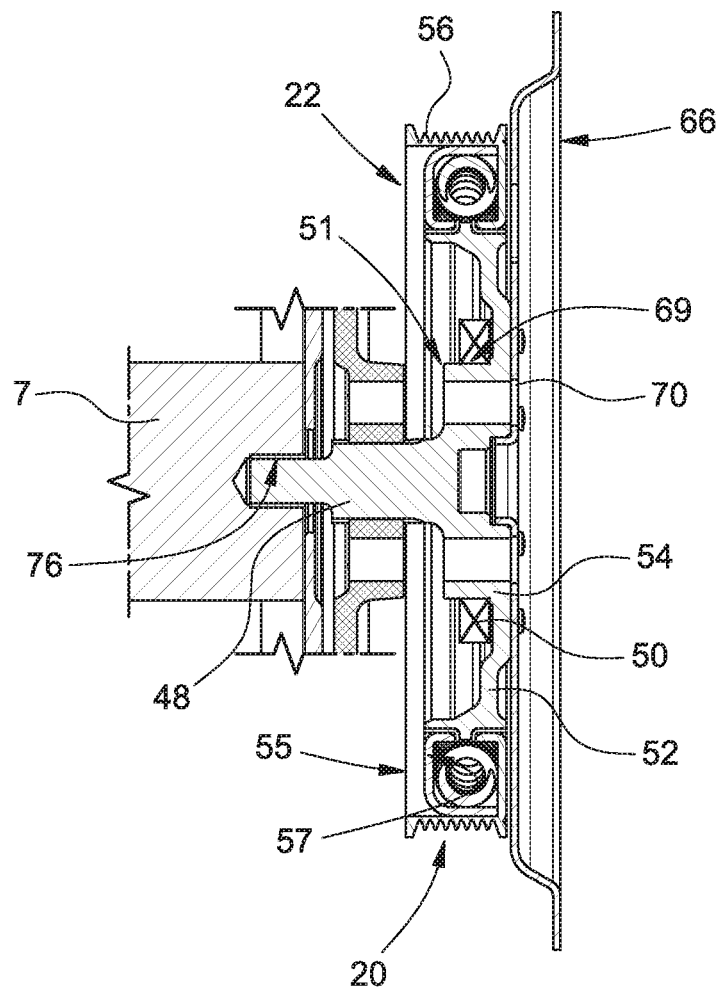
FIG. 15 is an enlarged section of the transmission module of FIG. 1.

With reference to FIGS. 1, 2 and 15, the number 1 indicates overall a P2 transmission module adapted to be connected between an internal combustion engine E and a transmission T of a hybrid drive vehicle, forming overall a hybrid drive unit H.

The module 1 is part of a hybrid unit 4 (FIGS. 3-11) comprising, apart from the module itself, an electric machine 2 and, optionally, one or more accessories such as, for example, a compressor 3 for an air conditioning system of the vehicle. The electric machine 2 is expediently of reversible type, namely it can operate as an electric motor to deliver torque to the transmission (in combination with or alternatively to the internal combustion engine) or as a generator to generate electric power.

The module 1 essentially comprises a tray-like support structure 5 and a module drive 6, for example by belt, housed in the support structure 5 and configured to operatively and selectively connect to one another a crankshaft 7 of the internal combustion engine E, the electric machine 2 and the transmission T.

The support structure 5 has a substantially flat base wall 8 and a perimeter flange 9 extending perpendicular to it and forming a plurality of enlargements 10 in which the holes are obtained for fastening the module 1 to the engine E. From the base wall 8 respective tubular appendages 15, 16, 17 extend axially (FIG. 3) each of which defines internally a through seat. The tubular appendages 15, 16, 17 have axes A, B and C coinciding respectively with the axis of the crankshaft 7 of the engine E, with the axis of the electric machine 2 and with the axis of the compressor 3, as will be better described below.

Figure 4:
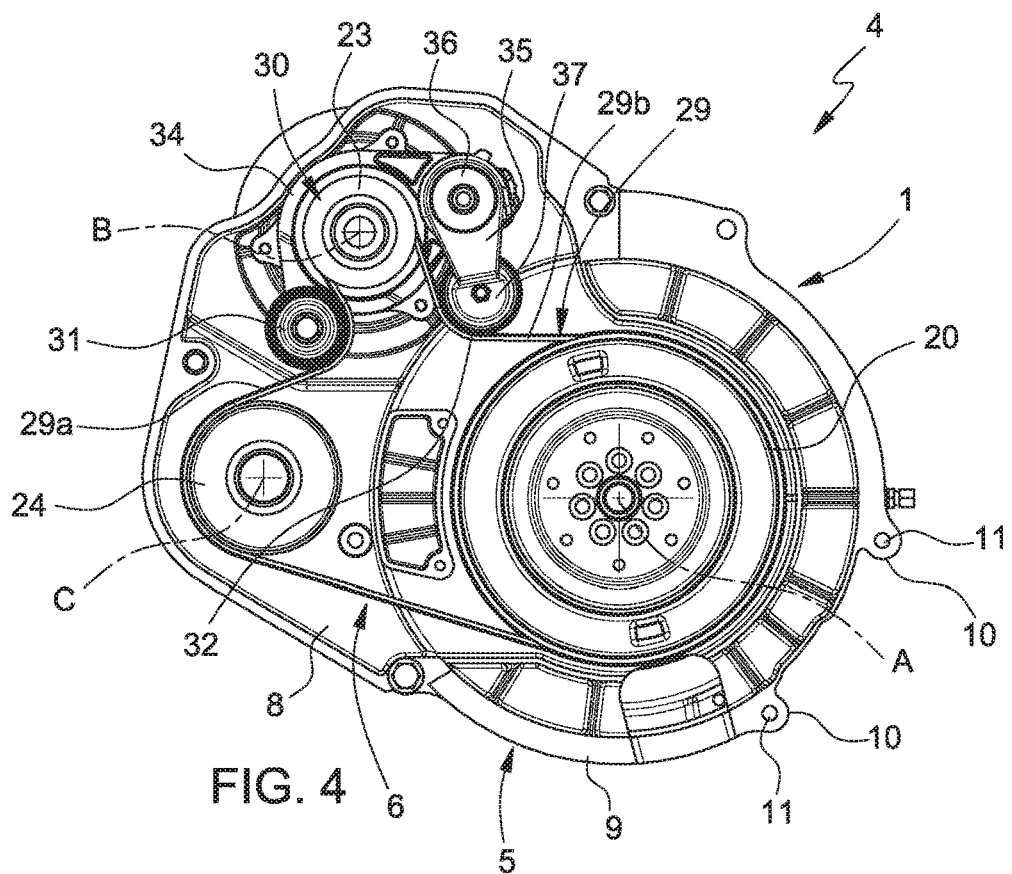
FIGS. 4, 5 and 6 are front elevation, rear perspective and rear elevation views respectively of a hybrid unit comprising the transmission module of FIG. 1.
Figure 5:
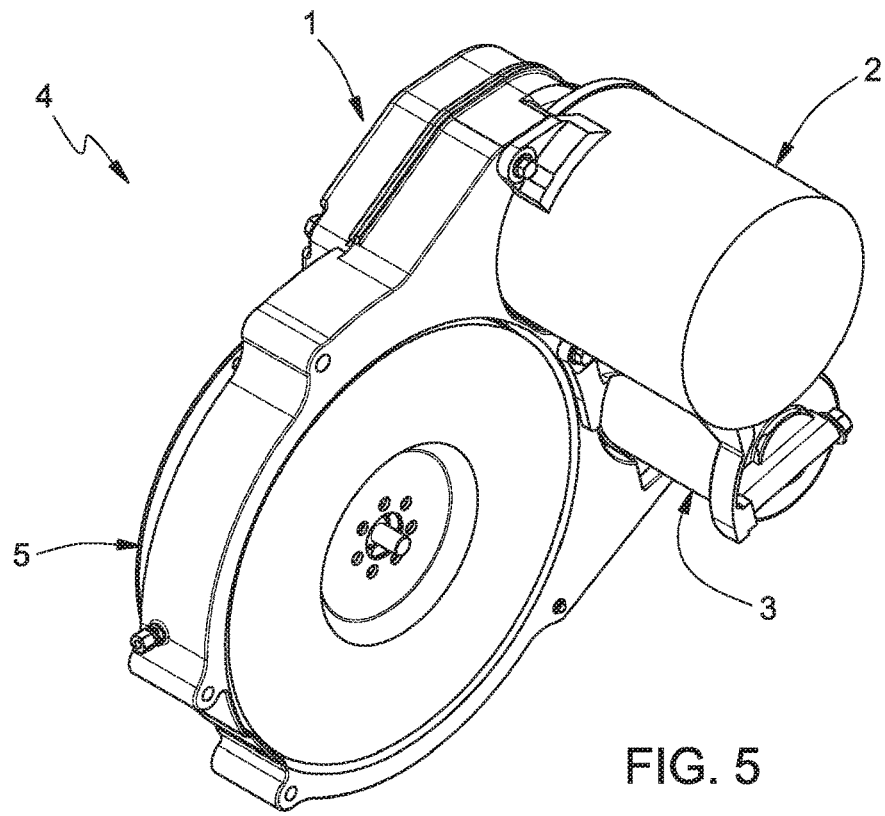
Figure 6:
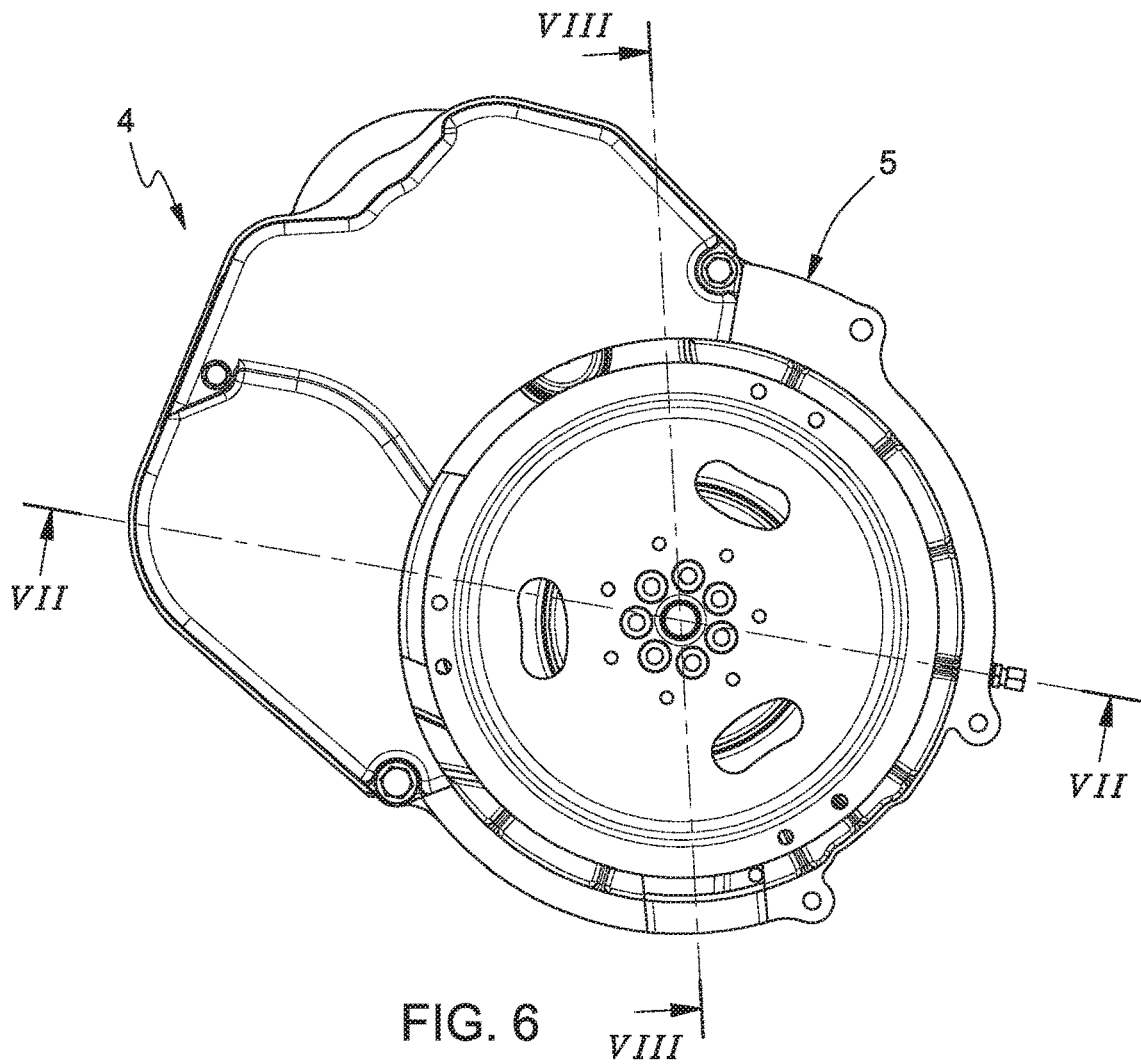

In the example illustrated, as can be clearly seen in FIGS. 2, 4 and 9, the module drive 6 comprises a first pulley 20 with axis A selectively connectable to the crankshaft 7 by means of a decoupling clutch 21, also forming part of the hybrid unit 4, and a torsional vibration damper 22 (FIGS. 7 and 8) described in detail below.

Figure 10:
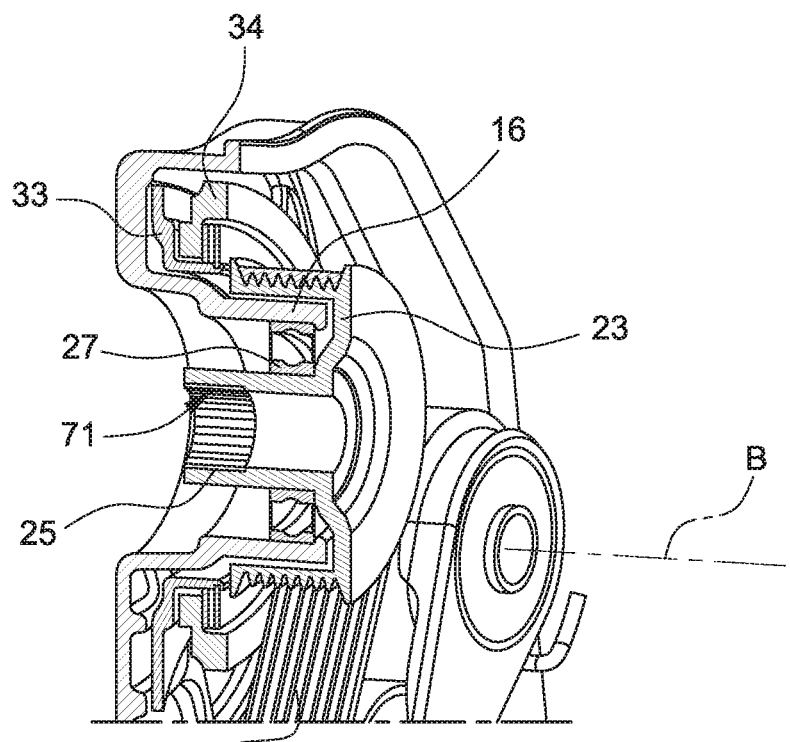
FIG. 10 and FIG. 11 are perspective views of respective details of the unit of FIG. 9.
Figure 11:
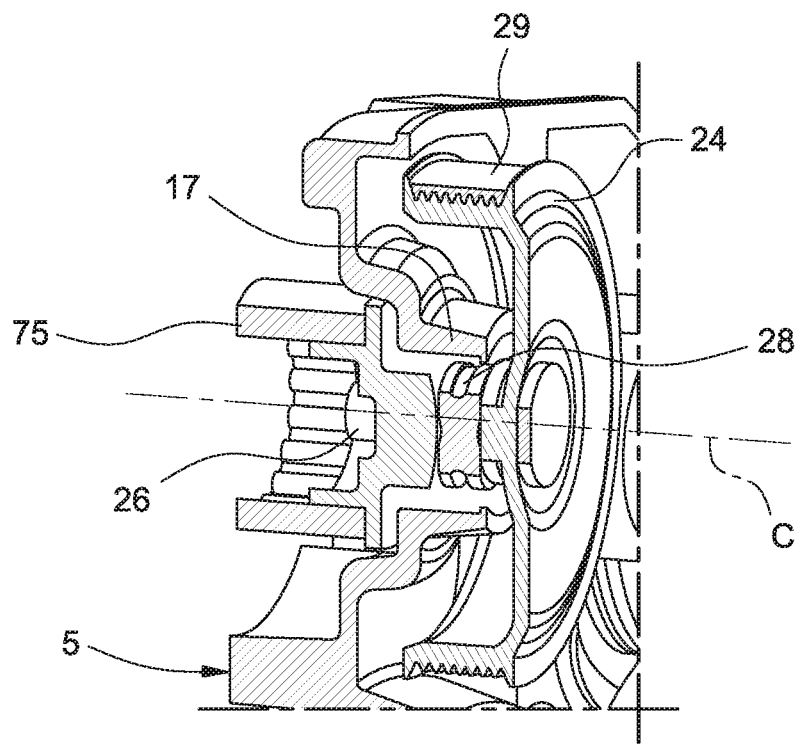

The module drive 6 further comprises a second pulley 23 having axis B adapted to be connected to the electric machine 2, and a third pulley 24 having axis C adapted to be connected to the compressor 3. For this purpose, the second pulley 23 and the third pulley 24 are provided with respective shafts 25, 26 which are housed in the respective tubular appendages 16, 17 and are supported therein by means of respective bearings 27, 28 (FIGS. 10 and 11).

The module drive 6 comprises a belt 29, preferably of poly-V type, which is wound around the pulleys 20, 23 and 24 and rotationally connects them to one another.

Lastly, the module drive 6 comprises a tensioner 30 with double arm having a first tensioner pulley 31 and a second tensioner pulley 32 which act on sections 29a, 29b of the belt 29 between the second pulley 23 and the third pulley 24 and, respectively, between the first pulley 20 and the second pulley 23 under the thrust of elastic means not illustrated.

The tensioner 30 comprises (FIGS. 4 and 10):
an annular base 33 fixed to the structure 5 around the tubular appendage 16,
a first annular arm 34 revolving on the base 33, on which the first tensioner pulley 31 is supported idle in an eccentric position, and
a second arm 35 having a first tubular end 36 hinged to the first arm 20 and a second end 37 on which the second tensioner pulley 32 is mounted idle.

The cited elastic means can consist of a spring (not illustrated) housed in the first end 36 of the second arm 35, which is configured so as to push the second arm 35 towards the first tensioner pulley 31.

Alternatively to the example described, the tensioner can be of any other type with double arm adapted to maintain a sufficient level of tension in the two sections 29a and 29b of the belt 29, each of which can be the slack section of the belt 15 depending on the operating conditions.

According to the description, the belt 29 can be pre-mounted on the support structure 5 and tensioned prior to assembly of the support structure 5 on the engine E.

As can be clearly seen in FIG. 8, the base wall 8 is shaped so as to define, on the opposite side of the module drive 6, a housing 38 for the clutch 21. The clutch 21 can be part of the module 1 or, as in the example described, a unit distinct from the module 1 and complementary to it. In any case, due to the housing of the clutch 21 in the support structure 5 of the module 1, which is shaped in a complementary manner to the clutch 21 on the side facing the latter, no additional axial dimensions are created.

The tubular appendage 15 (FIG. 8) has a substantially C-shaped section open towards the housing 38 so as to define an annular seat 39 communicating with the latter. The seat 39 houses a hydraulic actuator 41 for control of the clutch 21.

Expediently, the support structure 5 defines an internal channel 44 for the supply/discharge of oil from the chamber 39 of the actuator 41; the channel 44 establishes communication between the chamber 39 and a radial fitting 45 arranged on the perimeter flange 9 of the support structure 5 and adapted to be connected with a hydraulic control circuit. In this way, additional dimensions are avoided, in particular axial dimensions, for the actuator 41 and the relative control circuit. The internal channel is expediently defined by two or more holes that can be made from the outside by means of conventional boring operations and intersecting with each other so as to define a continuous path between the fitting 45 and the chamber 39; the inlets of the holes can be closed by plugs, where necessary.

The clutch 21, described here summarily insofar as necessary for understanding of the present invention but not forming part of the invention, essentially comprises a first disc 46 adapted to be fixed to the crankshaft 7 and a second disc 47 connected in an angularly integral but axially free manner to a shaft 48 of the damper 22, with axis A, by means of a splined coupling 59 (FIG. 8).

Figure 7:
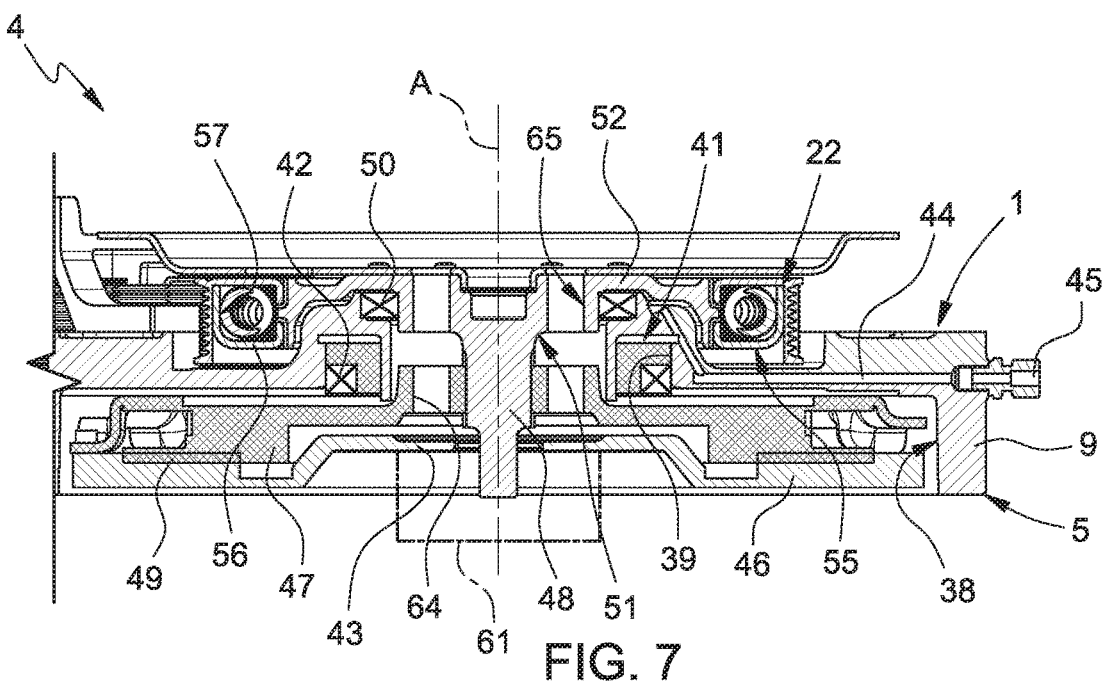

More precisely, as can be clearly seen in FIG. 7, the first disc 46 of the clutch 21 is provided with a series of holes 43 for fastening to an end flange 61 of the crankshaft 7 by means of a corresponding series of screws 62 (FIG. 9) provided with respective heads 63.

Between the discs 46 and 47 of the clutch 21 one or more friction discs 49 are interposed. The clutch 21 is kept normally closed by elastic means not illustrated and rotationally connects the shaft 48 of the damper 22 to the crankshaft 7 in the absence of operation of the actuator 41; when the actuator 41 is hydraulically operated, it opposes the elastic closing force, so as to separate the second disc 47 from the first disc 46. Between the actuator 41 (rotationally fixed) and the second disc 47 (rotating) a bearing 42 is interposed which allows the transmission of axial loads and the relative rotation.

The damper 22 is illustrated in greater detail in FIGS. 12 to 15, and comprises an actuator 51 provided with a hub 54 connected rigidly (and preferably integral) to the shaft 48, which projects from the hub towards the internal combustion engine E. From the hub 54 a disc 52 extends radially provided with two radial spokes 53. The actuator 51 is supported on the tubular appendage 15 by a bearing 50, as better described below.

The damper 22 further comprises an annular casing 55 formed of a half-shell 56 housed inside the first pulley 20 and of the latter.

The casing 55 delimits an annular chamber 57 divided by diametrically opposite internal lugs 58 of the half-shell 56 and of the first pulley 20 in two substantially semicircular housings, inside which respective arched springs 60 are arranged. The spokes 53 of the disc 52 of the actuator 51 run inside the annular chamber 57 and are comprised between respective ends of the springs 60, which stop against the lugs 58 so as to rotationally couple in an elastic manner the first pulley 20 to the actuator 51, and therefore to the second disc 47 of the clutch 21 rotationally integral with the shaft 48 of the actuator 51.

Figure 12:
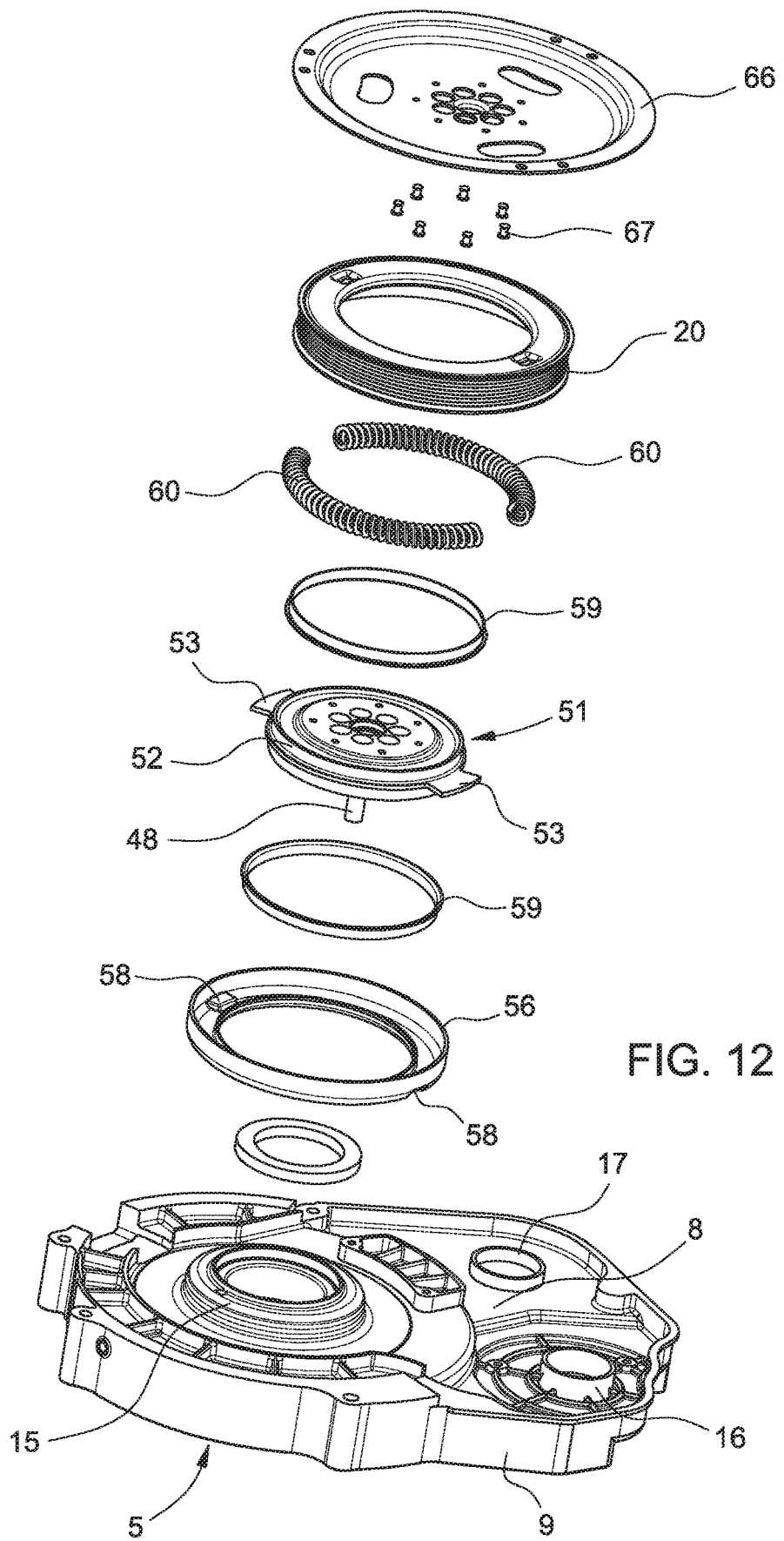
FIG. 12 is an exploded perspective view of a damper of the transmission module of FIG. 1.

The half-shell 56 and the pulley 20, integral with each other by press-fitting and/or welding, are supported in a revolving manner with respect to the disc 52 of the actuator 51 by means of a pair of rings 59 having the function of plain bearings (FIG. 12).

Expediently, the second disc 47 of the clutch 21 and the disc 52 of the actuator 51 of the damper 22 are provided with corresponding series of holes 64, 65 having position corresponding to that of the holes 43 and diameter sufficient to allow passage of the heads 63 of the screws 62 for fastening the first disc 46 to the flange 61 of the crankshaft 7.

A flex plate 66 is fixed to the disc 52 of the actuator 51, constituting the interface member between the module 1 and the transmission T.

In particular, the flex plate 66 is connected to the disc 52 by means of a plurality of rivets 67 in the vicinity of an inner edge thereof, and is adapted to be connected to a torque converter of the transmission T (not illustrated) at an outer edge thereof. The flex plate 66 is able to compensate slight relative axial displacements between the module 1 and the transmission T.

The actuator 51, in addition to providing the kinematic functions described, has a crucial role in the relative centering of the elements of the hybrid drive unit H and therefore in facilitating the assembly operations.

Figure 13:
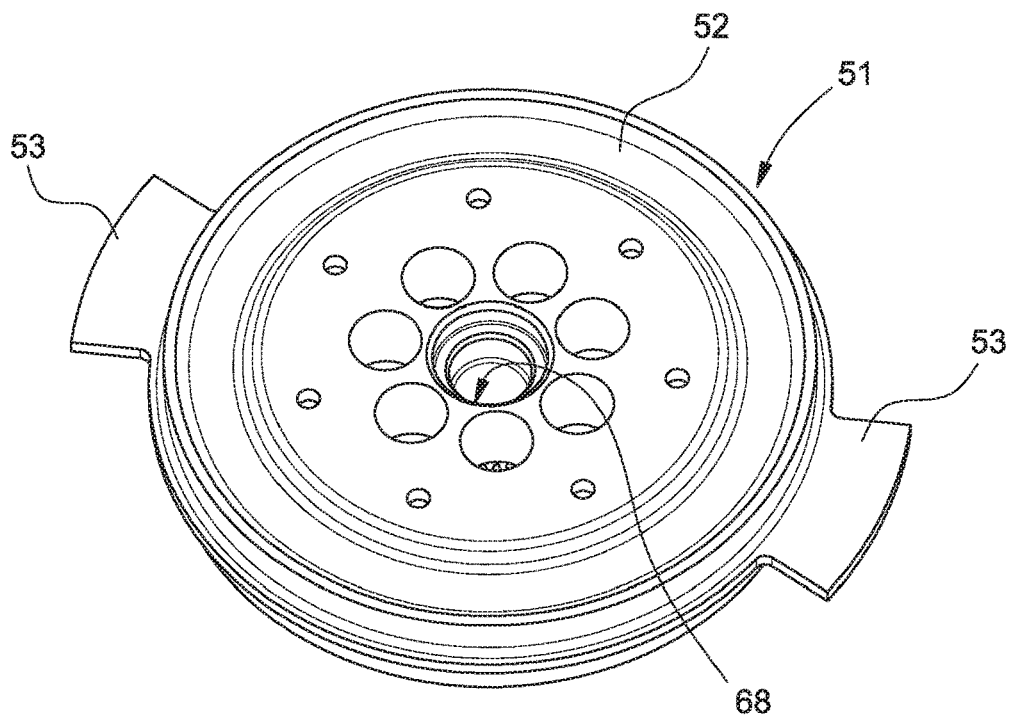
FIG. 13 and FIG. 14 are perspective views from the opposite sides of a detail of the damper of FIG. 12.
Figure 14:
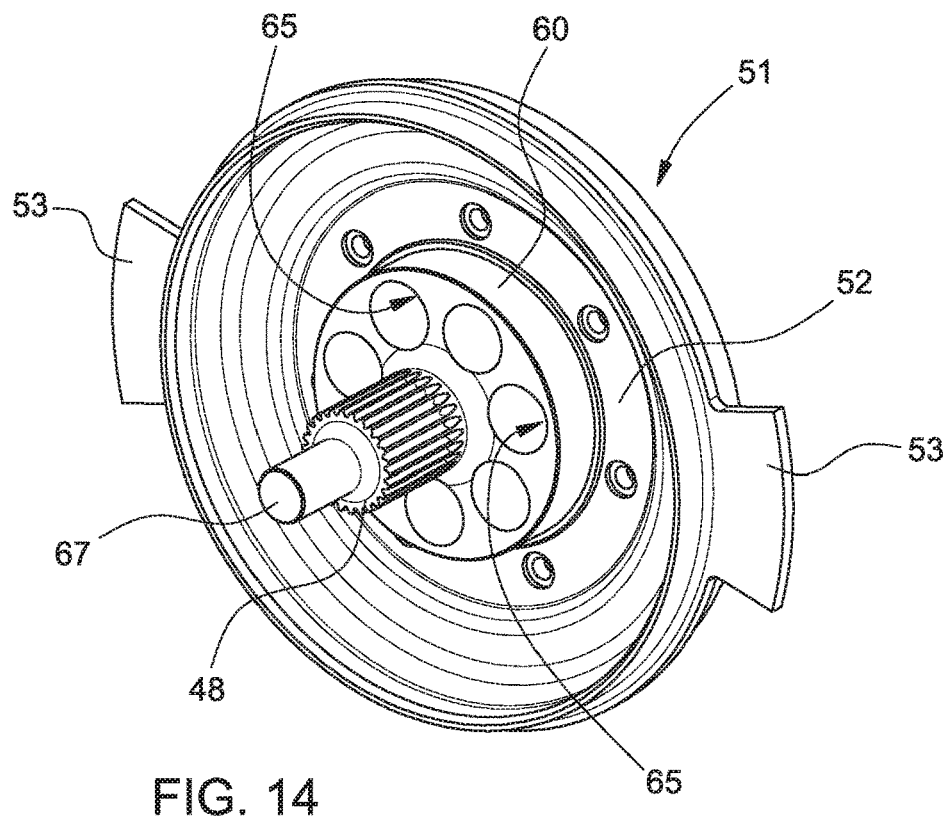

In particular, with reference to FIGS. 13, 14 and 15, the shaft 48 has at an end thereof a cylindrical centering nose 67 adapted to couple slidingly with a centering hole 76 of the crankshaft 7; at an opposite end, the actuator 51 has a blind axial hole 68 adapted to couple with a corresponding centering nose (not illustrated) of the torque converter.

The hub 54 of the actuator 51 defines a seat 69 for the bearing 50 (and therefore the centering with respect to the support structure 5).

The disc 52 extends radially from the hub 54 in the vicinity of an end of the hub facing in use towards the vehicle transmission T; the hub 54 forms at said end a circular lug 70 for centering of the flex plate 66.

With reference to FIGS. 9 and 10, the electric machine 2 is provided with a casing 71 and a rotor (not illustrated) to which a splined shaft 72 is connected. The latter slidingly engages a splined inner portion 73 of the shaft 25, so as to accomplish with it an angular but axially free coupling.

With reference to FIGS. 9 and 11, the compressor 3 is provided with a casing 73 and a rotor (not illustrated) to which a splined shaft 74 is connected. The latter slidingly engages an internally splined sleeve 75 rigidly connected to the shaft 26, so as to accomplish with said sleeve an angular but axially free coupling.

As described previously, the connection of the module 1 to the clutch 21, to the electric machine 2 and to the compressor 3 is made by simple axial coupling of the relative rotating members with respective members of the module 1 appropriately configured (shaft 48, shaft 25, sleeve 75). Said members therefore constitute real "power ports" of the module 1, to which the units complementary to the module can be connected extremely easily and with which they can exchange mechanical power.

This considerably facilitates the assembly operations, since the electric machine 2 and the compressor 3 can be connected to the module 1 before or after fixing of the latter to the engine E; alternatively, the electric machine 2 and the compressor 3 could be fixed directly to the engine E.

The operation of the transmission module 1, already partly evident from the previous description, is the following.

When the clutch 21 is closed, the actuator 51 is connected both to the internal combustion engine (E), and to the electric machine 2 by means of the damper 22, known per se, and the module drive 6, and to the vehicle transmission T by means of the flex plate 66.

In this condition, the electric machine 2 can be used both as a generator (for recharging the battery with the internal combustion engine on, or as regenerative brake) and as a motor for starting the internal combustion engine or for delivery of an additional torque with the internal combustion engine on (boosting).

When the clutch 21 is open, the electric motor can be used for electric drive, electric braking and coasting with the internal combustion engine off.

From an examination of the characteristics of the module 1 produced according to the present invention, the advantages it offers are evident.

In particular, the module of the invention, thanks to the centering functions concentrated on the actuator 51 of the damper 22, facilitates assembly of the module and allows easy precision centering during assembly.

Lastly it is clear that modifications and variations can be made to the module 1 described which do not depart from the protective scope defined by the claims.

In particular, the module drive 6 can be by chain or gear, instead of by belt. In this case, in place of the pulleys, pinions for chain or gears are used, and means for lubrication of the module must be provided.

The invention claimed is:

1. Transmission module for a hybrid drive unit of a vehicle, the drive unit including:
   an internal combustion engine provided with a crankshaft, a decoupling clutch arranged coaxially with the crankshaft and a vehicle transmission,
   the transmission module being configured to be interposed between the engine and the transmission and comprising:
   a support structure configured to be secured to the engine;
   a module drive housed in the support structure and comprising:
   a first transmission member having an axis coinciding, in use, with the axis of the crankshaft and of the decoupling clutch;
   a torsional vibration damper configured to connect an output member of the decoupling clutch with the first transmission member;
   at least a second transmission member adapted to be connected to an electric machine;
   a transmission element connecting at least the said first and second transmission members;
   said torsional vibration damper comprising an actuator provided with a hub (54), a disc coaxial with the hub and adapted to be coupled to the first transmission member by elastic means and a shaft extending from one side of the hub in use facing the engine,
   wherein the shaft comprises an end portion configured to define a centering with respect to the crankshaft and a splined portion for coupling with a disc of the decoupling clutch rotationally fixed and axially sliding, the hub defining a seat for a bearing supporting the support structure and, on a side facing in use the vehicle transmission, a centering for a transmission member.

2. The module as claimed in claim 1, characterized in that the end portion of the shaft is a cylindrical nose adapted to engage a centering hole formed on an end flange of the crankshaft.

3. The module as claimed in claim 1, characterized in that the hub has a plurality of axial holes distributed around said axis and arranged so as to face the fastening screws of the decoupling clutch to the crankshaft, said holes having a sufficient diameter for said screws to pass through.

4. The module as claimed in claim 1, characterized in that it comprises a flex plate secured to the actuator on one side facing the vehicle transmission and adapted to be connected to a transmission torque converter.

5. The module as claimed in claim 4, characterized in that the actuator comprises a disc extending radially from the hub in the vicinity of one end of the hub facing in use the vehicle transmission, said hub forming at said end a centering for the flex plate.

6. The module as claimed in claim 5, wherein the disc is provided with holes for connecting the flex plate.

7. The module as claimed in claim 4, characterized in that the centering for a transmission member comprises an axial bore of the hub configured to be engaged by a shaft of the torque converter.

8. The module as claimed in claim 4, characterized in that the actuator disc is provided with two radial spokes, the damper (21) comprising an annular casing integral with the first pulley and defining an annular chamber in which the spokes run, said elastic means comprising at least one pair of arched springs housed in the annular chamber and configured for interposing between the spokes and respective internal stops of the annular casing.

* * * * *